Figure 11:
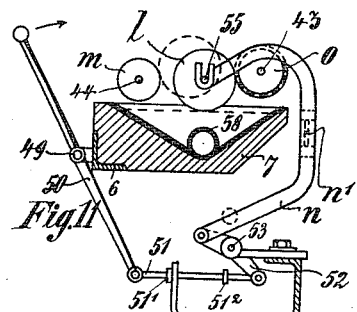

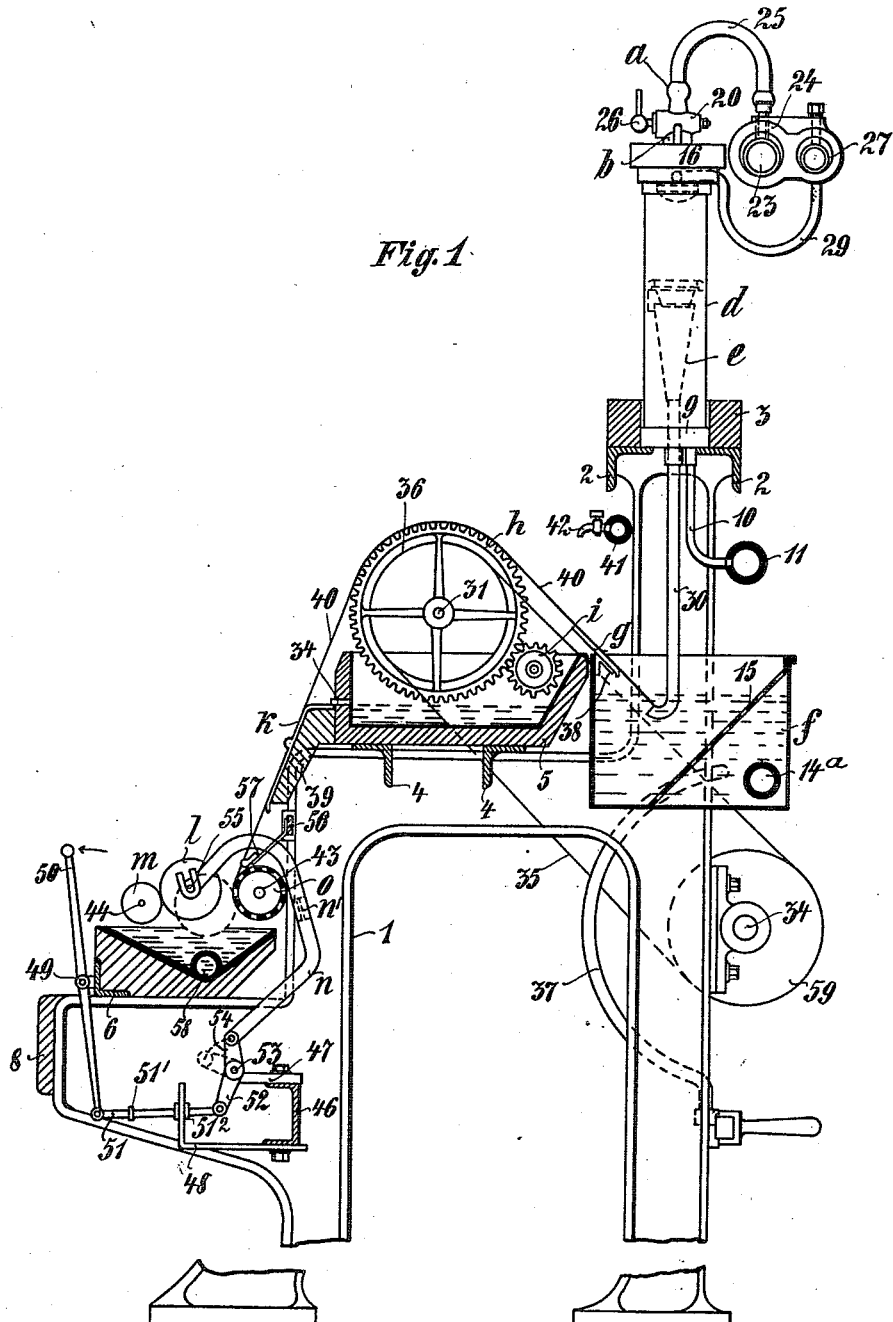

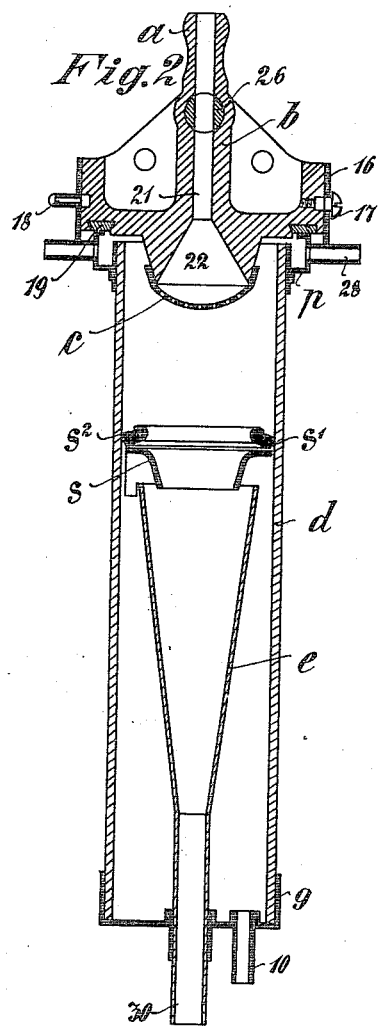
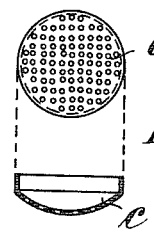
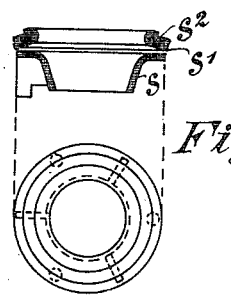
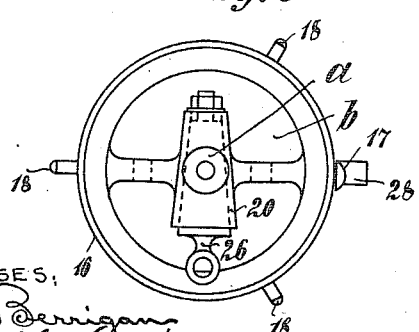

E. ELSÄSSER.
MACHINE FOR SPINNING VISCOUS LIQUIDS.
APPLICATION FILED MAY 7, 1908.
957,460.
Patented May 10, 1910.
4 SHEETS—SHEET 3.
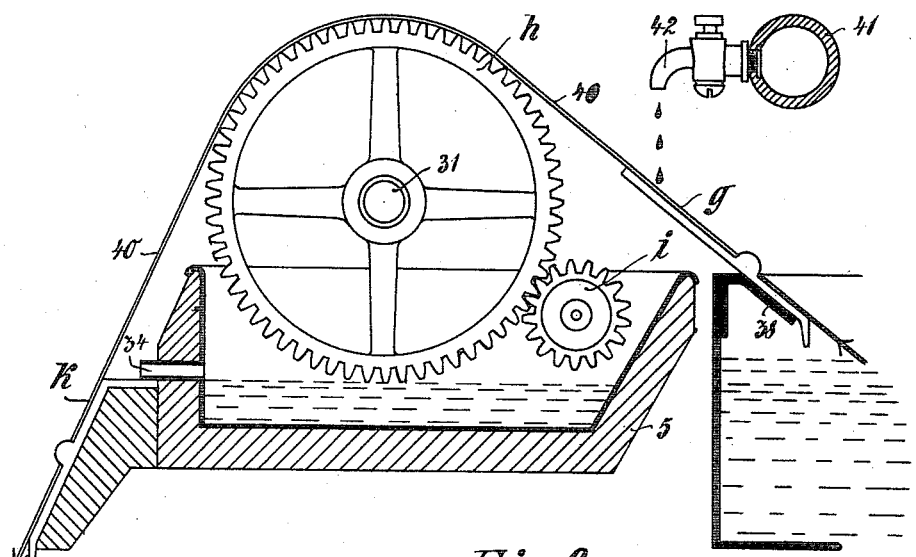
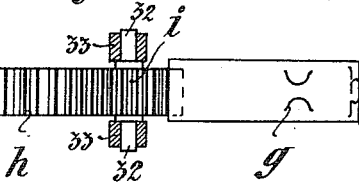
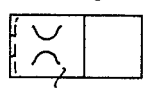
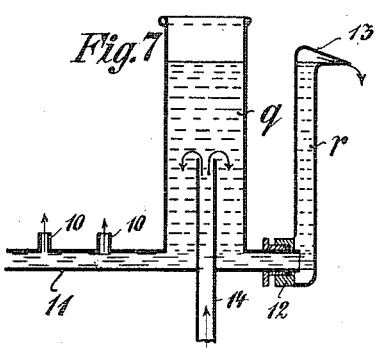
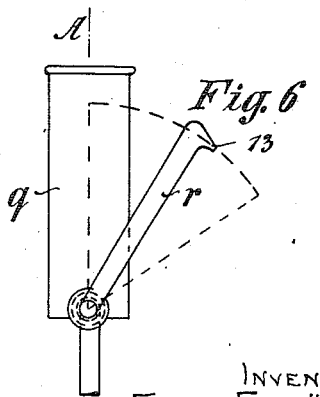
INVENTOR,
EMIL ELSÄSSER,
by van Oldeneel & Schoenlank
Attorneys.
WITNESSES:

E. ELSÄSSER.
MACHINE FOR SPINNING VISCOUS LIQUIDS.
APPLICATION FILED MAY 7, 1908.

957,460.

Patented May 10, 1910.
4 SHEETS—SHEET 4.

WITNESSES;

INVENTOR,
EMIL ELSÄSSER,
by
Attorneys.

UNITED STATES PATENT OFFICE.

EMIL ELSÄSSER, OF BARMEN-RITTERSHAUSEN, GERMANY.

MACHINE FOR SPINNING VISCOUS LIQUIDS.

957,460.

Specification of Letters Patent. Patented May 10, 1910.

Application filed May 7, 1908. Serial No. 431,433.

*To all whom it may concern:*

Be it known that I, EMIL ELSÄSSER, a citizen of the Empire of Germany, residing at Barmen-Rittershausen, in the Empire of Germany, have invented a new and useful Machine for Spinning Viscous Liquids, of which the following is a specification.

My invention relates to improvements in machines for spinning viscous liquids, whereby irregularities in the spun artificial threads and the thereby caused frequent breakages of the latter are avoided.

According to my invention a special conveying device is inserted between every spinning-rose or die and the corresponding winding-spool, so that the several threads issuing from the rose or die are conveyed at a uniform speed to the winding-spool and the winding takes place without considerable tension. The said conveying device essentially comprises a glass cylinder with a nozzle and a glass funnel beneath the spinning-rose or die, a tube, a carrying gear wheel, and smooth guide plates. The threads produced from the viscous liquid by issuing through the apertures of the spinning-rose or die first pass through a current of fresh precipitation-liquid flowing downward at a comparatively slow speed through the upper part of the glass cylinder above the glass funnel, so that the threads are thereby preliminarily stiffened before they pass on to the revolving carrying gear wheel. The teeth of the latter receive the threads and convey them to the winding-spool. Means are provided for so driving the carrying gear wheel and the winding-spool, that their peripheries run at the same speed as the threads. As the teeth of the carrying gear wheel do not support the threads on their whole length, but only on points at distances like the tooth pitch, a current of already used precipitation-liquid is passed upward through the lower part of the glass cylinder to the nozzle by which it is diverted downward while it mixes with fresh precipitation-liquid whereupon the mixture passes through the funnel at an increasing speed and through the tube at a maximum speed. Thus the threads are further stiffened and are carried with the strong current, so that no considerable tension is produced in the threads during their movement from the spinning-rose or die to the carrying gear wheel. To prevent the formation of considerable eddies in the immediate neighborhood of the spinning-rose or die, which would damage the still very delicate threads, the interior of the glass cylinder is divided by the nozzle which keeps off the strong current of spent precipitation-liquid from the tranquil current of fresh precipitation-liquid. With the aid of the nozzle it is also rendered possible to carry off the air-bubbles contained in the spent precipitation-liquid. In order to prevent the damage to the threads by pressing too hard upon supporting surfaces, I arrange in front of and also, if necessary, behind the carrying gear wheel smooth plates of glass, porcelain or the like. Where so preferred a suitable liquid is permitted to fall on these guide plates for further treating the threads. A small gear wheel is provided which meshes with the carrying gear wheel for removing therefrom the liquid collecting in the tooth spaces and also for removing any broken threads. Other improvements will be hereinafter set forth.

I will now proceed to describe my invention with reference to the accompanying drawings, in which—

Figure 12:
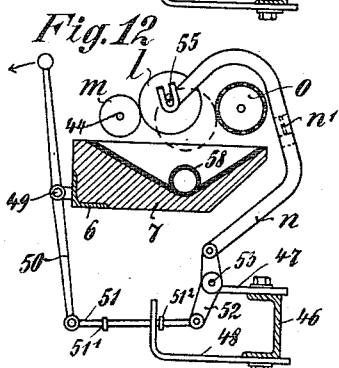
Figure 13:
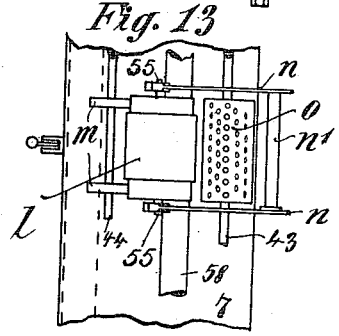
Figure 14:
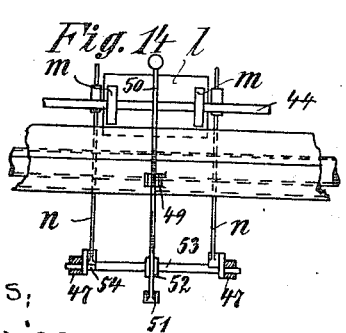
Figure 15:
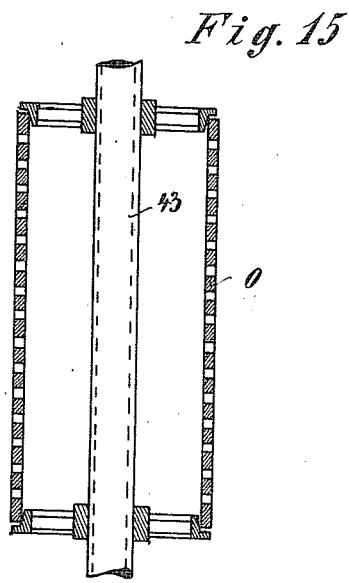
Figure 16:
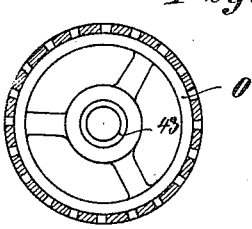
Figure 17:
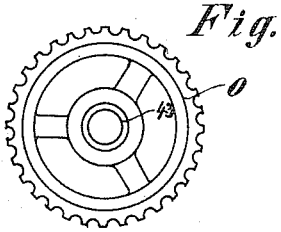

Figure 1 is a vertical cross section through the improved spinning machine in a mode of execution, Fig. 2 is a vertical cross section on an enlarged scale through a head with the spinning-rose or die, a glass cylinder and a glass funnel, Fig. 3 is a plan of the same, Fig. 4 shows the spinning-rose or die in bottom view and cross section, Fig. 5 shows the dividing nozzle in cross section and plan, Fig. 6 is an elevation of a pressure-regulator, when looked at from a side of the machine, Fig. 7 is a vertical longitudinal section through the same on the line A—B in Fig. 6, Fig. 8 is a part out of Fig. 1 on an enlarged scale and shows the carrying gear wheel, the small cleaning gear wheel, the two guide plates, the liquid vessel below and a part of the liquid collecting vessel beneath the glass cylinder, Fig. 9 is a plan of the two gear wheels and the right guide plate, Fig. 10 is a plan of the left guide plate, Fig. 11 is a part out of Fig. 1 and shows the winding-spool, the trough thereunder, and the mechanism for operating the spool, the parts being shown in their normal position, Fig. 12 is a similar view, in which the parts occupy their other extreme position, Fig. 13 is a plan of the same, Fig. 14 is a front view of the same, Fig. 15 is a horizontal longitudinal section on an enlarged scale through the sieve-cylinder working with the winding-spool, Fig. 16 is a vertical cross section through the same, and Fig. 17 is an end view of the same.

Similar characters of reference refer to similar parts throughout the several views.

The machine comprises a frame of any known construction. For example this frame may consist of two side parts 1 (of which only one is shown at Fig. 1), two upper rails 2, 2 with a board 3 on them, two middle rails 4, 4 with a liquid vessel 5 thereon, a liquid collecting vessel $f$, a lower rail 6, a trough 7 and a board 8. In suitable holes of the upper board 3 a row of vertical glass cylinders $d$ is secured and supported by the rails 2, 2. The metallic bottoms 9 (Fig. 2) cemented to the several glass cylinders $d$ are by bent tube branches 10 connected with a supplying tube 11, which passes along the rear of the machine frame and is therein secured in any known manner (not shown). This supplying tube 11 communicates with the vertical open vessel $q$ (Fig. 7) of a pressure-regulator and also with a tube $r$, which is turnable on it and is tightened by means of a stuffing-box 12 or the like. The tube $r$ is provided with an overflow 13 and can be turned through an angle, about as indicated by the dotted lines in Fig. 6, and can be adjusted in its position in any known manner (not shown).

Through the bottom of the vessel $q$ passes (Fig. 7) a tube 14 upward to a convenient point, while it is connected with a pump (not shown) of any known construction and arranged to be driven from the machine. The suction part of this pump is connected by a tube with the perforated tube 14, which passes through the whole collecting vessel $f$ and is adapted to collect the already used precipitation-liquid for conveying it to the pump. Preferably an inclined sieve 15 is provided in the collecting vessel $f$ for separating the impurities. Each glass cylinder $d$ is at its upper end provided with a metallic head-piece 16 cemented to it. Into this head-piece a cover $b$ can be introduced, after which it is secured like a bayonet, its screw 17 engaging in a bent slot and pins 18, 18 engaging its recesses. Preferably a ring 19 of india rubber or the like is provided in the cover $b$ for tightening the joint in such a manner, that an annular space $p$ is formed around the upper edge of the glass cylinder $d$ and communicates with the latter. The cover $b$ is cast in one piece with a mouthpiece $a$ and a cock-casing 20 (see Figs. 1 and 3) and is provided with a vertical central bore 21, which widens conically at 22. A spinning-rose or die $c$ (see Fig. 4) made from sheet metal with a slightly diverging rim can be easily put over a corresponding rim of the cover $b$, as is clearly shown at Fig. 2. A supplying tube 23 (Fig. 1) is supported in suitable parts 24 of the machine frame and passes along the row of glass cylinders $d$ and is provided with tubular branches, which are connected with the corresponding mouthpieces $a$ by means of hose 25. The said supplying tube 23 is to be connected with a reservoir (not shown) containing the viscous liquid, for example a concentrated solution of cellulose in ammoniac copper. This liquid can be admitted to any glass cylinder $d$ by opening the plug 26 of its cock. Another tube 27 is secured in the parts 24 parallel to the supplying tube 24 and is provided with tubular branches which are severally connected with the annular spaces $p$ in the various head-pieces 16 by means of tubes 28 and hose 29. The tube 27 is to be connected with a reservoir for fresh precipitation-liquid, which may be for example a diluted acid.

Within each glass cylinder $d$ a glass funnel $e$ is provided, which is shown as made in one piece with a glass tube 30. This tube 30 is secured in the metallic bottom 9 and extends downward into the liquid in the collecting vessel $f$, its lower end being bent a little beneath the level. A nozzle $s$ provided with three radial ribs (Fig. 5) is placed on the upper edge of the glass funnel $e$ and divides the interior of the cylinder $d$ into two chambers, of which the upper one is for the fresh precipitation-liquid and the lower one for the already used precipitation-liquid. The latter is constantly circulated by the pump mentioned above and flows from the tube 10 upward in the annular space between the glass cylinder $d$ and the glass funnel $e$ whereupon the current is diverted by the nozzle $s$ downward into the funnel $e$. To prevent eddies near the spinning-rose or die $c$ a packed ring $s^1$ is shown as placed on the nozzle $s$ and is tightened on the inside of the cylinder by its ring $s^2$ of india rubber. In this manner the air bubbles contained in the already used precipitation-liquid are prevented from passing upward into the fresh precipitation-liquid and are carried off downward with the current through the funnel $e$ and the tube 30.

Above the liquid vessel 5 a horizontal shaft 31 (Figs. 1, 8 and 9) is mounted to turn in the machine frame and has fastened on it a row of carrying gear wheels $h$ disposed in the central planes of the glass cylinders $d$. The several carrying gear wheels mesh with small gear wheels $i$, which are separately mounted to turn with their pins 32, 32 in suitable bearings 33, 33 (Fig. 9) in the vessel 5. The latter is shown as lined with sheet metal and provided with a series of overflow tubes 34, whereby the level of the liquid is made constant, and the teeth of the carrying gear wheels $h$ are arranged to just dip into the liquid during their revolution. A driving shaft 34 is provided in the machine frame and is arranged to be driven in any known manner. This shaft 34 carries fast and loose pulleys 59 and is adapted to drive the shaft 31 by means of an endless belt 35 and a drum 36, a belt fork 37 being provided for throwing the machine in and out of gear. The collecting vessel $f$ is provided with a series of supports 38 (Fig. 8), on which inclined guide plates $g$ of glass, porcelain or the like are fastened. Each guide plate $g$ serves for supporting the spun artificial threads 40 on their path from the bent lower end of the glass tube 30 to the periphery of the carrying gear wheel $h$. Preferably also on the front a board 39 is placed on the machine frame and carries a series of guide plates $k$ of glass, porcelain or the like for supporting the threads 40 during their movement from the carrying gear wheel $h$ to the sieve-cylinders $o$ to be presently described. Thereby the friction of the threads is considerably reduced and less breakages will result. Above the series of guide plates $g$ a horizontal tube 41 is disposed on the machine frame and is provided with a series of cocks 42, from which a suitable liquid can be permitted to drop on the guide plates $g$ (see Fig. 8) for further treatment of the thread-bundle 40.

Above the trough 7 a horizontal shaft 43 is mounted to turn in the machine frame and has fastened on it a series of sieve-cylinders $o$ in the central planes of the carrying gear wheels $h$ and the glass cylinders $d$. Another shaft 44 parallel to 43 is mounted to turn in the machine frame and carries a series of pairs of supporting disks $m$. The two shafts 43 and 44 are driven from the driving shaft 34 either directly or indirectly in any known manner. The driving gear so far described should be so proportioned, as to impart a uniform speed to the peripheries of the carrying gear wheels $h$, the sieve-cylinders $o$ and the disks $m$, which speed is preferably made like that of the currents passing through the glass tubes 30 or nearly so. By adjusting the position of the turnable tube $r$ the head of the liquid in the vessel $q$ of the pressure-regulator can be varied and thereby the speed of the liquid passing upward in the several glass cylinders $d$.

In the machine frame is fastened a rail 46, on which a series of supports 47 above and a series of bent guides 48 below are secured. On the rail 6 a series of brackets 49 is provided, in which two-armed hand-levers 50 are mounted to rock. The lower arm of each hand-lever 50 is pivotally connected with a rod 51, which is guided in the corresponding guide 48 and is provided with two stops $51^1$ and $51^2$ for limiting its stroke. To each hand-lever 50 belongs a horizontal shaft 53, which is mounted to rock in two of the supports 47 and carries in its middle an arm 52 and at the ends two arms 54. The arm 52 is pivotally connected with the rod 51 already mentioned and the two arms 54 are pivotally connected with two bent levers $n$ $n$ which in their middles are connected together by a cross rod $n^1$ and pass over the shaft 43 and are forked at their upper ends. Into these forked ends engage the pins 55, 55 (Fig. 13) of a winding-spool $l$. Fig. 11 shows the parts described in their normal position, so that the winding-spool $l$ by reason of its own weight and that of the bent levers $n$ $n$ bears on the sieve-cylinder $o$. When the hand-lever 50 is turned forward in the direction of the arrow in Fig. 11 until the stop $51^2$ on the rod 51 strikes the guide 48, the two bent levers $n$ $n$ will tilt over to the front and the winding spool $l$ will bear on the two disks $n$, as is shown at Fig. 12.

Above the series of sieve-cylinders $o$ a horizontal rod 56 is longitudinally guided in the machine frame and carries a series of thread guides 57 which reciprocate over the several sieve-cylinders $o$. The rod 56 is reciprocated from the machine in any known manner. The liquid escaping from the trough 5 through the overflow tubes 34 is permitted to flow over the guide plates $k$ and to fall on the sieve-cylinders $o$ and therefrom into the trough 7. On the bottom of the latter is disposed a perforated tube 58, through which the excess of the liquid is permitted to escape to some place.

The spinning machine operates as follows: When it is started, the solution of cellulose or other viscous liquid will flow under pressure into the space 22 over the spinning-rose or die $c$ in each glass cylinder $d$ and issue from the apertures of the die $c$ in more or less fine threads, which gradually stiffen in the tranquil current of fresh precipitation liquid in the upper part of the cylinder $d$. It is only after the threads have acquired a certain solidity, that the bundle of threads passes through the current which is formed of a part of the fresh precipitation-liquid and of the constantly circulating spent precipitation-liquid and passes at an increasing speed through the funnel $e$ and at the maximum speed through the glass tube 30 as already mentioned above. In this manner damage to the threads owing to violent treatment by the liquid is avoided. The thread-bundle 40 passes with the current through the glass tube 30 and emerges from the liquid in the collecting vessel $f$, whereupon the threads 40 pass upward over the guide plate $g$ and place themselves on the teeth of the revolving carrying gear wheel $h$. In order to prevent the thread-bundle 40 from adhering to the teeth of the gear wheel $h$ or forming deposits in the tooth spaces, the teeth are made to repeatedly and consecutively dip in the liquid in the vessel 5. The small gear wheel $i$ meshing with the carrying gear wheel $h$ removes therefrom the liquid collected in the tooth spaces and also any broken threads. At the commencement of spinning or after breakage of a thread the winding-spool $l$ stands in the position of Fig. 12, that is, it is above the level of the liquid and rests against the two disks $m$, so that the end of the thread-bundle 40 can be conveniently attached to the spool $l$, after which the hand-lever 50 is moved into its normal position shown at Fig. 11. Thereby the spool $l$ is lowered, so that it just dips under the level of the liquid and presses against the sieve-cylinder $o$, which by friction will put it into rotation. The spool $l$ winds on the thread-bundle 40 and the sieve-cylinder $o$ removes the liquid taken from the spool and prevents the formation of a disadvantageous film of liquid at the line of contact between the spool and the cylinder. As the thread-bundle 40 is conveyed with a uniform speed from the end of the glass funnel $e$ to the spool $l$ it is practically wound without pulling, whereby the regularity of the several threads is preserved. When the spool $l$ is full, it is removed from the liquid by raising the bent levers $n$ $n$, lifted from its bearing forks and replaced by an empty one.

The spinning machine presents the advantage, that the fresh precipitation-liquid can be allowed to enter the glass cylinder $d$ very slowly without requiring the speed of circulation of the liquid to be reduced accordingly.

The machine may be varied in many respects without departing from the spirit of my invention. It may serve for the ordinary process of spinning with immediate stiffening as well as for the process of spinning with stretching, as invented by Edmund Thiele and described in his U. S. Patent No. 710,819, dated Oct. 7, 1902.

I claim:

1. In a machine for spinning viscous liquids, the combination with a spinning vessel, of a spinning die for issuing the viscous liquid in threads, means for introducing fresh precipitation-liquid in a tranquil current into said spinning vessel near said spinning die, and means for introducing used precipitation liquid in a quick current into said spinning vessel separated from said fresh precipitation-liquid and so that said used precipitation-liquid comes in contact with said threads only at a certain distance from said spinning-die and after the threads have sufficiently hardened to endure the action of the quick current.

2. In a machine for spinning viscous liquids, the combination with a spinning-vessel, of a spinning-die at the top of said spinning-vessel for issuing the viscous liquid in threads, a funnel within said spinning-vessel, a nozzle above said funnel, means for passing fresh precipitation-liquid in a tranquil current through said spinning-vessel from said spinning-die to said nozzle, and means for circulating spent precipitation-liquid so that it passes through said spinning-vessel upward to said nozzle and along same over the edge of said funnel and mixes with fresh precipitation-liquid, whereupon the mixture passes downward through the funnel carrying the threads off.

3. In a machine for spinning viscous liquids, the combination with a spinning-vessel, of a spinning-die at the top of said spinning-vessel for issuing viscous liquid in threads, a funnel within said spinning-vessel, a nozzle above said funnel, a ring above said nozzle and tightened on the inside of said spinning-vessel for keeping off all air-bubbles from said spinning-die, leaving a small opening between said nozzle and said ring, means for passing fresh precipitation-liquid in a tranquil current through said spinning-vessel from said spinning-die to said nozzle, means for circulating spent precipitation liquid so that it passes through said spinning-vessel upward to said nozzle and along same over the edge of said funnel and mixes with fresh precipitation-liquid, whereupon the mixture passes downward through the funnel carrying the threads off.

4. In a machine for spinning viscous liquids, the combination with a spinning-vessel, of a spinning-die at the top of said spinning-vessel for issuing the viscous liquid in threads, means for passing fresh precipitation-liquid in a tranquil current through said spinning-vessel, means for circulating spent precipitation-liquid so that it passes downward through the lower part of the said spinning-vessel, and a carrying tooth wheel receiving the threads from said spinning-vessel and being so driven that the periphery runs at the same speed as the threads.

5. In a machine for spinning viscous liquids, the combination with a spinning-vessel for issuing the viscous liquids in threads, means for passing fresh precipitation-liquid in a tranquil current through said spinning-vessel and means for circulating spent precipitation-liquid so that it passes downward through the lower part of the said spinning-vessel, a carrying gear wheel for receiving the threads from said spinning-vessel and being so driven that its periphery runs at the same speed as the threads, and a second gear wheel meshing with said gear wheel and adapted to remove therefrom the liquid collecting in the tooth spaces and also any broken threads.

6. In a machine for spinning viscous liquids, the combination with a spinning-vessel, of a spinning-die at the top of said spinning-vessel for issuing the viscous liquids in threads, means for passing fresh precipitation-liquid in a tranquil current through said spinning-vessel and means for circulating spent precipitation-liquid so that it passes downward through the lower part of the said spinning vessel, smooth guide plates adapted to support the threads leaving said spinning-vessel, and cocks above said guide-plates for treating the threads by dropping liquids on said guide-plates.

EMIL ELSÄSSER. [L. S.]

Witnesses:
 OTTO KÖNIG,
 WILLY FURWEL.